US011169555B2

(12) United States Patent
Luke et al.

(10) Patent No.: US 11,169,555 B2
(45) Date of Patent: *Nov. 9, 2021

(54) APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES

(71) Applicant: Gogoro Inc., Hong Kong (CN)

(72) Inventors: Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,043

(22) Filed: Jul. 2, 2019

(65) Prior Publication Data
US 2020/0035046 A1 Jan. 30, 2020

Related U.S. Application Data

(63) Continuation of application No. 15/384,055, filed on Dec. 19, 2016, now Pat. No. 10,345,843, which is a
(Continued)

(51) Int. Cl.
*G05F 1/66* (2006.01)
*H02J 7/00* (2006.01)
(Continued)

(52) U.S. Cl.
CPC .............. *G05F 1/66* (2013.01); *B60L 1/00* (2013.01); *B60L 3/0046* (2013.01);
(Continued)

(58) Field of Classification Search
CPC .......... G05B 19/05; G05B 2219/15048; G05B 2219/15053; G05F 1/66; G06F 3/0608;
(Continued)

(56) References Cited

U.S. PATENT DOCUMENTS

| 5,542,488 A * | 8/1996 | Nixon ..................... B60L 58/21 180/65.1 |
| 5,951,229 A * | 9/1999 | Hammerslag ........... B60L 50/64 414/398 |
| 6,331,762 B1 * | 12/2001 | Bertness ................ H02J 7/163 320/134 |
| 9,552,682 B2 * | 1/2017 | Luke ..................... E05B 81/56 |

(Continued)

FOREIGN PATENT DOCUMENTS

| JP | 2004030168 A | 1/2004 |
| JP | 2004355838 A | 12/2004 |
| JP | 2011118638 A | 6/2011 |
| WO | 2010115573 A1 | 10/2010 |

OTHER PUBLICATIONS

Official Hearing Notice Received for Indian Application No. IN1348/DELNP/2014; Applicant: Gogoro Inc., dated Jun. 25, 2020, 3 pages.

*Primary Examiner* — Chun Cao
(74) *Attorney, Agent, or Firm* — Perkins Coie LLP

(57) ABSTRACT

A network of collection, charging and distribution machines collect, charge and distribute portable electrical energy storage devices. To charge, the machines employ electrical current from an external source. As demand at individual collection, charging and distribution machines increases or decreases relative to other collection, charging and distribution machines, a distribution management system initiates redistribution of portable electrical energy storage devices from one collection, charging and distribution machine to another collection, charging and distribution machine in an expeditious manner. Also, redeemable incentives are offered to users to return or exchange their portable electrical energy storage devices at selected collection, charging and distribution machines within the network to effect the redistribution.

20 Claims, 8 Drawing Sheets

Related U.S. Application Data continuation of application No. 13/559,091, filed on Jul. 26, 2012, now Pat. No. 9,552,682.

(60) Provisional application No. 61/647,936, filed on May 16, 2012, provisional application No. 61/647,941, filed on May 16, 2012, provisional application No. 61/601,953, filed on Feb. 22, 2012, provisional application No. 61/601,949, filed on Feb. 22, 2012, provisional application No. 61/601,404, filed on Feb. 21, 2012, provisional application No. 61/581,566, filed on Dec. 29, 2011, provisional application No. 61/557,170, filed on Nov. 8, 2011, provisional application No. 61/534,761, filed on Sep. 14, 2011, provisional application No. 61/534,753, filed on Sep. 14, 2011, provisional application No. 61/534,772, filed on Sep. 14, 2011, provisional application No. 61/511,900, filed on Jul. 26, 2011, provisional application No. 61/511,887, filed on Jul. 26, 2011, provisional application No. 61/511,880, filed on Jul. 26, 2011.

(51) Int. Cl.

| | |
|---|---|
| *H01M 10/48* | (2006.01) |
| *B60L 15/20* | (2006.01) |
| *B60L 3/00* | (2019.01) |
| *B60L 53/14* | (2019.01) |
| *B60L 53/80* | (2019.01) |
| *B60L 55/00* | (2019.01) |
| *B60L 53/65* | (2019.01) |
| *B60L 53/10* | (2019.01) |
| *B60L 58/10* | (2019.01) |
| *B60L 58/16* | (2019.01) |
| *B60L 50/60* | (2019.01) |
| *B60L 53/30* | (2019.01) |
| *B60L 53/68* | (2019.01) |
| *H02J 11/00* | (2006.01) |
| *G07C 5/00* | (2006.01) |
| *H01M 10/42* | (2006.01) |
| *G06Q 30/02* | (2012.01) |
| *H02J 4/00* | (2006.01) |
| *G06F 3/06* | (2006.01) |
| *B60L 1/00* | (2006.01) |
| *E05B 47/00* | (2006.01) |
| *E05B 81/04* | (2014.01) |
| *G07C 9/00* | (2020.01) |
| *G07F 15/00* | (2006.01) |
| *H01M 10/44* | (2006.01) |
| *B60L 7/06* | (2006.01) |
| *B60L 7/14* | (2006.01) |
| *B60L 7/22* | (2006.01) |
| *B60L 50/40* | (2019.01) |
| *B60L 50/51* | (2019.01) |
| *B60L 53/66* | (2019.01) |
| *B60L 58/21* | (2019.01) |
| *B60L 58/26* | (2019.01) |
| *B60L 50/64* | (2019.01) |
| *G07C 5/08* | (2006.01) |
| *B60L 1/02* | (2006.01) |
| *B60L 1/14* | (2006.01) |
| *E05B 81/56* | (2014.01) |
| *G01C 21/34* | (2006.01) |
| *G06Q 10/02* | (2012.01) |
| *G05B 19/05* | (2006.01) |
| *B60R 25/04* | (2013.01) |
| *B60L 3/12* | (2006.01) |
| *G06Q 30/06* | (2012.01) |
| *G01C 21/36* | (2006.01) |
| *G07F 17/00* | (2006.01) |
| *G07F 17/12* | (2006.01) |

(52) U.S. Cl.

CPC ......... *B60L 3/0069* (2013.01); *B60L 15/2045* (2013.01); *B60L 50/60* (2019.02); *B60L 50/66* (2019.02); *B60L 53/11* (2019.02); *B60L 53/14* (2019.02); *B60L 53/305* (2019.02); *B60L 53/65* (2019.02); *B60L 53/68* (2019.02); *B60L 53/80* (2019.02); *B60L 55/00* (2019.02); *B60L 58/10* (2019.02); *B60L 58/16* (2019.02); *E05B 47/0001* (2013.01); *E05B 81/04* (2013.01); *G06F 3/0671* (2013.01); *G06Q 30/0253* (2013.01); *G06Q 30/0259* (2013.01); *G06Q 30/0261* (2013.01); *G06Q 30/0267* (2013.01); *G07C 5/00* (2013.01); *G07C 9/00309* (2013.01); *G07F 15/003* (2013.01); *G07F 15/005* (2013.01); *H01M 10/4257* (2013.01); *H01M 10/482* (2013.01); *H02J 4/00* (2013.01); *H02J 7/00* (2013.01); *H02J 7/007* (2013.01); *H02J 7/0013* (2013.01); *H02J 7/0021* (2013.01); *H02J 7/0027* (2013.01); *H02J 7/0029* (2013.01); *H02J 7/0047* (2013.01); *H02J 11/00* (2013.01); *B60L 1/003* (2013.01); *B60L 1/02* (2013.01); *B60L 1/14* (2013.01); *B60L 3/003* (2013.01); *B60L 3/0061* (2013.01); *B60L 3/12* (2013.01); *B60L 7/06* (2013.01); *B60L 7/14* (2013.01); *B60L 7/22* (2013.01); *B60L 50/40* (2019.02); *B60L 50/51* (2019.02); *B60L 50/64* (2019.02); *B60L 53/665* (2019.02); *B60L 58/21* (2019.02); *B60L 58/26* (2019.02); *B60L 2200/12* (2013.01); *B60L 2200/24* (2013.01); *B60L 2210/12* (2013.01); *B60L 2210/14* (2013.01); *B60L 2210/30* (2013.01); *B60L 2220/14* (2013.01); *B60L 2220/16* (2013.01); *B60L 2220/46* (2013.01); *B60L 2240/12* (2013.01); *B60L 2240/14* (2013.01); *B60L 2240/26* (2013.01); *B60L 2240/421* (2013.01); *B60L 2240/423* (2013.01); *B60L 2240/427* (2013.01); *B60L 2240/429* (2013.01); *B60L 2240/525* (2013.01); *B60L 2240/545* (2013.01); *B60L 2240/622* (2013.01); *B60L 2240/642* (2013.01); *B60L 2240/645* (2013.01); *B60L 2240/662* (2013.01); *B60L 2240/70* (2013.01); *B60L 2250/10* (2013.01); *B60L 2250/16* (2013.01); *B60L 2250/18* (2013.01); *B60L 2250/20* (2013.01); *B60L 2250/22* (2013.01); *B60L 2260/44* (2013.01); *B60L 2260/52* (2013.01); *B60L 2270/34* (2013.01); *B60L 2270/46* (2013.01); *B60R 25/04* (2013.01); *E05B 81/56* (2013.01); *G01C 21/3476* (2013.01); *G01C 21/3682* (2013.01); *G05B 19/05* (2013.01); *G05B 2219/15048* (2013.01); *G05B 2219/15053* (2013.01); *G06F 3/0608* (2013.01); *G06F 3/0638* (2013.01); *G06Q 10/02* (2013.01); *G06Q 30/0639* (2013.01); *G07C 5/0858* (2013.01); *G07C 2009/00769* (2013.01); *G07F 15/006* (2013.01); *G07F 17/0042* (2013.01); *G07F 17/12* (2013.01); *H01M 10/425* (2013.01); *H01M 10/441* (2013.01); *H01M 2010/4271* (2013.01); *H01M 2010/4278* (2013.01); *H01M*

*2220/20* (2013.01); *H01M 2220/30* (2013.01); *H02J 7/00036* (2020.01); *H02J 7/0045* (2013.01); *H02J 7/00045* (2020.01); *Y02E 60/00* (2013.01); *Y02E 60/10* (2013.01); *Y02T 10/64* (2013.01); *Y02T 10/70* (2013.01); *Y02T 10/7072* (2013.01); *Y02T 10/72* (2013.01); *Y02T 10/92* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01); *Y04S 30/14* (2013.01); *Y04S 50/10* (2013.01); *Y04S 50/14* (2013.01); *Y10T 70/7062* (2015.04)

(58) Field of Classification Search
CPC .. G06F 3/0638; G06F 3/0671; B60L 15/2045; B60L 1/00; B60L 1/003; B60L 1/02; B60L 1/14; H01M 10/425; H01M 2010/4271; H01M 2010/4278; H01M 2220/30; H01M 10/4257; H01M 10/441
See application file for complete search history.

(56) References Cited

U.S. PATENT DOCUMENTS

| | | | |
|---|---|---|---|
| 9,776,601 B2* | 10/2017 | Bercovici | H02J 7/00036 |
| 10,345,843 B2* | 7/2019 | Luke | B60L 53/68 |
| 2002/0026252 A1* | 2/2002 | Wruck | B60L 58/10 |
| | | | 700/90 |
| 2007/0184339 A1* | 8/2007 | Scheucher | B60L 58/22 |
| | | | 429/99 |
| 2009/0082957 A1 | 3/2009 | Agassi et al. | |
| 2010/0012406 A1* | 1/2010 | Kressner | B60L 50/16 |
| | | | 180/65.22 |
| 2010/0017045 A1* | 1/2010 | Nesler | B60L 53/68 |
| | | | 700/296 |
| 2010/0145717 A1* | 6/2010 | Hoeltzel | B60L 53/305 |
| | | | 705/1.1 |
| 2010/0191585 A1* | 7/2010 | Smith | G06Q 20/14 |
| | | | 705/13 |
| 2012/0074893 A1* | 3/2012 | Cole | H02J 7/35 |
| | | | 320/101 |

* cited by examiner

┌─ 800
│
┌──────────────────────────────────────────────────────────┐ ─ 802
│ Redistribute the one or more portable electrical energy storage │
│ devices from the one or more collection, charging and │
│ distribution machines having the surplus of charged portable │
│ electrical energy storage devices to the one or more other │
│ selected collection, charging and distribution machines having │
│ the deficit of charged portable electrical energy storage devices │
└──────────────────────────────────────────────────────────┘

┌──────────────────────────────────────────────────────────┐ ─ 902
│ Send, based on analyzing the information regarding portable │
│ electrical energy storage device exchanges, information initiating │
│ at least one of: installation of one or more new collection, charging │
│ and distribution machines and removal of one or more existing │
│ collection, charging and distribution machines of the plurality of │
│ collection, charging and distribution machines │
└──────────────────────────────────────────────────────────┘

┌──────────────────────────────────────────────────────────┐ ─ 1002
│ Receive information regarding demand for charged │
│ portable electrical energy storage devices, the demand │
│ being at a plurality of collection, charging and distribution │
│ machines for portable electrical energy storage devices │
└──────────────────────────────────────────────────────────┘
                            ↓
┌──────────────────────────────────────────────────────────┐ ─ 1004
│ Determine a redistribution of portable electrical energy │
│ storage devices between the plurality of collection, │
│ charging and distribution machines according to at least │
│ the received information regarding demand │
└──────────────────────────────────────────────────────────┘
                            ↓
┌──────────────────────────────────────────────────────────┐ ─ 1006
│ Send information initiating the redistribution between the │
│ plurality of collection, charging and distribution machines │
└──────────────────────────────────────────────────────────┘

*FIG.10*

┌─ 1100
│ ┌──────────────────────────────────────────────────────────┐ ─ 1102
│ │ Determine the redistribution according to a first number of portable │
│ │ electrical energy storage devices currently removably located at a │
│ │ collection, charging and distribution machine of the plurality of │
│ │ collection, charging and distribution machines to be charged at an │
│ │ accelerated rate relative to at least a second number of portable │
│ │ electrical energy storage devices currently removably located at the │
│ │ collection, charging and distribution machine via energy supplied from │
│ │ at least the second number of portable electrical energy storage devices │
│ └──────────────────────────────────────────────────────────┘

*FIG.11*

┌─ 1200
│ ┌──────────────────────────────────────────────────────────┐ ─ 1202
│ │ Analyze the information regarding demand to increase the likelihood │
│ │ of availability of charged portable electrical energy storage devices at │
│ │ selected collection, charging and distribution machines of the plurality │
│ │ of collection, charging and distribution machines to meet current or │
│ │ predicted demand of charged portable electrical energy storage devices │
│ │ at the particular collection, charging and distribution machines of the │
│ │ plurality of collection, charging and distribution machines │
│ └──────────────────────────────────────────────────────────┘

*FIG.12*

┌─ 1300
│ ┌──────────────────────────────────────────────────────────┐ ─ 1302
│ │ Send the information regarding demand to one or more │
│ │ portable electrical energy storage device transfer services │
│ └──────────────────────────────────────────────────────────┘

*FIG.13*

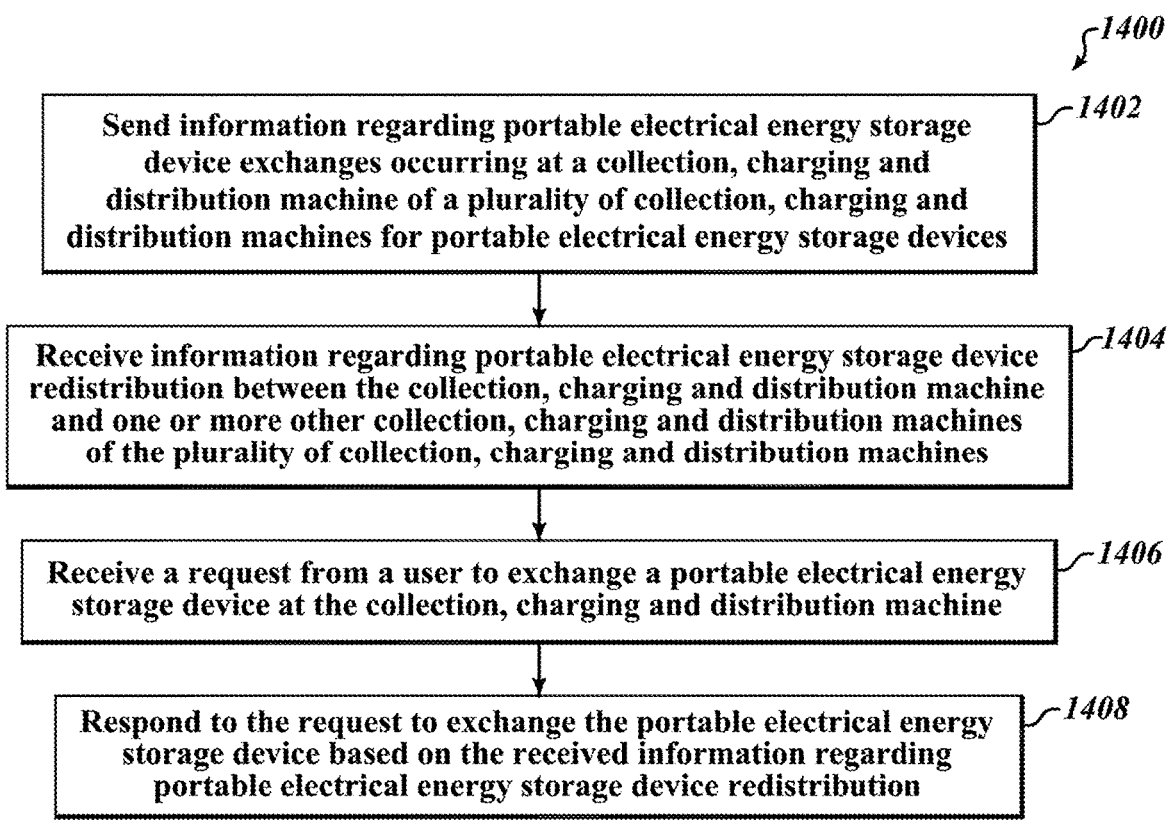

APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES

CROSS-REFERENCE TO RELATED APPLICATIONS

This application is a continuation of U.S. patent application Ser. No. 15/384,055, filed on Dec. 19, 2016, issued as U.S. Pat. No. 10,345,843, entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES," which is a continuation of U.S. patent application Ser. No. 13/559,091, entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES," filed Jul. 26, 2012, which is issued as U.S. Pat. No. 9,552,682, which claims benefit of U.S. Provisional Patent Application Ser. No. 61/511,900, entitled "APPARATUS, METHOD AND ARTICLE FOR COLLECTION, CHARGING AND DISTRIBUTING POWER STORAGE DEVICES, SUCH AS BATTERIES," filed Jul. 26, 2011, U.S. Provisional Patent Application Ser. No. 61/647,936, entitled "APPARATUS, METHOD AND ARTICLE FOR COLLECTION, CHARGING AND DISTRIBUTING POWER STORAGE DEVICES, SUCH AS BATTERIES," filed on May 16, 2012, U.S. Provisional Patent Application Ser. No. 61/534,753, entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES," filed on Sep. 14, 2011, U.S. Provisional Patent Application Ser. No. 61/534,761, entitled "APPARATUS, METHOD AND ARTICLE FOR AUTHENTICATION, SECURITY AND CONTROL OF POWER STORAGE DEVICES SUCH AS BATTERIES," filed on Sep. 14, 2011, U.S. Provisional Patent Application Ser. No. 61/534,772, entitled "APPARATUS, METHOD AND ARTICLE FOR AUTHENTICATION, SECURITY AND CONTROL OF POWER STORAGE DEVICES, SUCH AS BATTERIES, BASED ON USER PROFILES," filed on Sep. 14, 2011, U.S. Provisional Patent Application Ser. No. 61/511,887, entitled "THERMAL MANAGEMENT OF COMPONENTS IN ELECTRIC MOTOR DRIVE VEHICLES," and filed Jul. 26, 2011, U.S. Provisional Patent Application Ser. No. 61/647,941, entitled "THERMAL MANAGEMENT OF COMPONENTS IN ELECTRIC MOTOR DRIVE VEHICLES," and filed May 16, 2012, U.S. Provisional Patent Application Ser. No. 61/511,880, entitled "DYNAMICALLY LIMITING VEHICLE OPERATION FOR BEST EFFORT ECONOMY," and filed Jul. 26, 2011, U.S. Provisional Patent Application Ser. No. 61/557,170, entitled "APPARATUS, METHOD, AND ARTICLE FOR PHYSICAL SECURITY OF POWER STORAGE DEVICES IN VEHICLES," filed on Nov. 8, 2011, U.S. Provisional Patent Application Ser. No. 61/581,566, entitled "APPARATUS, METHOD AND ARTICLE FOR A POWER STORAGE DEVICE COMPARMENT," filed on Dec. 29, 2011, U.S. Provisional Patent Application Ser. No. 61/601,404, entitled "APPARATUS, METHOD AND ARTICLE FOR PROVIDING VEHICLE DIAGNOSTIC DATA," filed on Feb. 21, 2012, U.S. Provisional Patent Application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES," filed on Feb. 22, 2012, and U.S. Provisional Patent Application Ser. No. 61/601,953, entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE," filed on Feb. 22, 2012.

BACKGROUND

Technical Field

The present disclosure generally relates to the distribution of rechargeable electrical power storage devices (e.g., secondary batteries, supercapacitors or ultracapacitors), which may be suitable for use in a variety of fields or applications, for instance transportation and non-transportation uses.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped with a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches or approaches the end of its stored charge, an end user may simply replace, exchange or otherwise swap batteries or other electrical power storage devices. This may address issues related to cost, as well as limited range and relatively long recharging times.

As previously noted, secondary batteries and other electrical power storage devices are relatively expensive. Thus, it is beneficial to stock the least number of electrical power storage devices possible, while still ensuring that demand for such is satisfied.

For these reasons, the ability to have electrical power storage devices available is important to commercial success of any such endeavor. A number of approaches are described herein to provide availability of charged electrical power storage devices to meet current demand, even in busy times of high traffic in certain locations. Such approaches generally determine a distribution of electrical power storage devices between the collection, charging and distribution machines to provide a better likelihood that charged electrical power storage devices will be available at high demand locations and provide methods for effecting the redistribution.

A method of operating a distribution system for portable electrical energy storage devices may be summarized as including receiving, by at least one configured distribution management system for portable electrical energy storage devices, information regarding portable electrical energy storage device exchanges occurring at a plurality of collection, charging and distribution machines for collection, charging and distribution of portable electrical energy storage devices; analyzing, by the at least one configured distribution management system, the information regarding portable electrical energy storage device exchanges to determine a redistribution of portable electrical energy storage devices between the plurality of collection, charging and distribution machines; and sending, by the at least one configured distribution management system, information initiating the redistribution between the plurality of collection, charging and distribution machines.

The information regarding portable electrical energy storage device exchanges may indicate a first one of the plurality of collection, charging and distribution machines has a lower inventory of charged portable electrical energy storage devices than a second one of the plurality of collection, charging and distribution machines and wherein the information initiating the redistribution may include information to initiate redistribution of one or more portable electrical energy storage devices from the second one of the plurality of collection, charging and distribution machines to the first one of the plurality of collection, charging and distribution machines. The sending the information may include causing a message to be sent, the message including information identifying a selected one or more of the collection, charging and distribution machines to return a portable electrical energy storage device to according to the determined redistribution. The message may include a redeemable incentive to the user to return the portable electrical energy storage device to the selected one or more collection, charging and distribution machines, the redeemable incentive being a credit provided to the user upon return of the portable electrical energy storage device to the selected one or more collection, charging and distribution machines for an upgraded or premium portable electrical energy storage device. The sending the information may include causing a message to be sent including instructions to redistribute one or more portable electrical energy storage devices from one or more collection, charging and distribution machines having a surplus of charged portable electrical energy storage devices to one or more other selected collection, charging and distribution machines having a deficit of charged portable electrical energy storage devices. The method may further include redistributing the one or more portable electrical energy storage devices from the one or more collection, charging and distribution machines having the surplus of charged portable electrical energy storage devices to the one or more other selected collection, charging and distribution machines having the deficit of charged portable electrical energy storage devices. The redistributing may include physically moving one or more portable electrical energy storage devices from the one or more collection, charging and distribution machines having the surplus of charged portable electrical energy storage devices to the one or more other selected collection, charging and distribution machines having the deficit of charged portable electrical energy storage devices. The physically moving may be performed by one or more delivery vehicles. The method may further include sending, by the at least one configured distribution management system, based on the analyzing the information regarding portable electrical energy storage device exchanges, information initiating at least one of: installation of one or more new collection, charging and distribution machines and removal of one or more existing collection, charging and distribution machines of the plurality of collection, charging and distribution machines.

A distribution management system for portable electrical energy storage devices may be summarized as including at least one processor of the distribution system; at least one processor-readable memory of the distribution system that stores instructions executable by the at least one processor to cause the at least one processor to: receive information regarding demand for charged portable electrical energy storage devices, the demand being at a plurality of collection, charging and distribution machines for portable electrical energy storage devices; determine a redistribution of portable electrical energy storage devices between the plurality of collection, charging and distribution machines according to at least the received information regarding demand; and send information initiating the redistribution between the plurality of collection, charging and distribution machines.

The information regarding demand may include information regarding relative demand for charged portable electrical energy storage devices between different times of day, week or year. The information regarding demand may include information regarding relative demand of charged portable electrical energy storage devices between geographical locations. The information regarding demand may include information regarding historic usage patterns of one or more of the plurality of collection, charging and distribution machines. The information regarding demand may include information regarding user vehicle locations. The information regarding demand may include information regarding portable electrical energy storage device charge capacity. The information regarding demand may include information regarding portable electrical energy storage device exchanges occurring at the plurality of collection, charging and distribution machines. The information regarding demand may include information regarding route information of users of one or more of the charged portable electrical energy storage devices. The instructions executable by the at least one processor to cause the at least one processor to determine the redistribution may include further instructions to cause the at least one processor to determine the redistribution according to a first number of portable electrical energy storage devices currently removably located at a collection, charging and distribution machine of the plurality of collection, charging and distribution machines to be charged at an accelerated rate relative to at least a second number of portable electrical energy storage devices currently removably located at the collection, charging and distribution machine via energy supplied from at least the second number of portable electrical energy storage devices. The instructions executable by the at least one processor to cause the at least one processor to determine the redistribution cause the at least one processor to determine the redistribution by analyzing the information regarding demand to increase the likelihood of availability of charged portable electrical energy storage devices at selected collection, charging and distribution machines of the plurality of collection, charging and distribution machines to meet current or predicted demand of charged portable electrical energy storage devices at the selected collection, charging and distribution machines of the plurality of collection, charging and distribution machines. The instructions executable by the at least one processor may cause the at least one processor to send information initiating the redistribution by causing a message to be sent, the message including information identifying a selected one or more of the collection, charging and distribution machines to return a portable electrical energy storage device to according to the determined redistribution. The information may be sent to one or more collection, charging and distribution machines of the plurality of collection, charging and distribution machines. The instructions executable by the at least one processor may cause the at least one processor to send the information to one or more users of one or more a portable electrical energy storage devices, the one or more a portable electrical energy storage devices being from one or more of the collection, charging and distribution machines of the plurality of collection, charging and distribution machines. The instructions executable by the at least one processor may cause the at least one processor to send the information to one or more portable electrical energy storage device transfer services.

A non-transitory computer-readable medium that stores instructions that when executed by a collection, charging and distribution machine for portable electrical energy storage devices of a plurality of collection, charging and distribution machines for portable electrical energy storage devices, cause the collection, charging and distribution machine to perform: sending information regarding portable electrical energy storage device exchanges occurring at the collection, charging and distribution machine; receiving information regarding portable electrical energy storage device redistribution between the collection, charging and distribution machine and one or more other collection, charging and distribution machines of the plurality of collection, charging and distribution machines; receiving a request from a user to exchange a portable electrical energy storage device at the collection, charging and distribution machine; and responding to the request to exchange the portable electrical energy storage device based on the received information regarding portable electrical energy storage device redistribution.

The sending information regarding portable electrical energy storage device exchanges may include sending the information to a central portable electrical energy storage device distribution management system. The responding to the request to exchange the portable electrical energy storage device may include causing a message to be presented to the user regarding exchanging the portable electrical energy storage device at one or more other selected collection, charging and distribution machines of the plurality of collection, charging and distribution machines according to the received information regarding portable electrical energy storage device redistribution. The message may include a redeemable incentive to the user to return the portable electrical energy storage device to the one or more other selected collection, charging and distribution machines. The incentive may be redeemable as a discount or credit on fees related to use of one or more of the plurality of collection, charging and distribution machines. The sending information regarding portable electrical energy storage device exchanges may include sending information regarding relative demand for charged portable electrical energy storage devices at the collection, charging and distribution machine between different times of day, week or year. The sending information regarding portable electrical energy storage device exchanges may include sending information regarding historic usage patterns at the collection, charging and distribution machine. The sending information regarding portable electrical energy storage device exchanges may include sending information regarding users of the collection, charging and distribution machine.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 8 is a flow diagram showing a low level method of operating the distribution management system of FIG. 3 and FIG. 4 to redistribute portable electrical energy storage devices between collection, charging and distribution machines, according to one non-limiting illustrated embodiment, including redistributing portable electrical energy storage devices, useful in the method of FIG. 5.

FIG. 9 is a flow diagram showing a low level method of operating the distribution management system of FIG. 3 and FIG. 4 to redistribute portable electrical energy storage devices between collection, charging and distribution machines, according to one non-limiting illustrated embodiment, including sending information regarding installation or removal of collection, charging and distribution machines, useful in the method of FIG. 5.

FIG. 10 is a flow diagram showing a high level method of operating the distribution management system of FIG. 3 and FIG. 4 to redistribute portable electrical energy storage devices between collection, charging and distribution machines, according to one non-limiting illustrated embodiment, including determining a redistribution based on received information regarding demand for charged portable electrical energy storage devices.

FIG. 11 is a flow diagram showing a low level method of operating the distribution management system of FIG. 3 and FIG. 4 to redistribute portable electrical energy storage devices between collection, charging and distribution machines, according to one non-limiting illustrated embodiment, including determining the redistribution according to an accelerated charging scenario at a collection, charging and distribution machine, useful in the method of FIG. 10.

FIG. 12 is a flow diagram showing a low level method of operating the distribution management system of FIG. 3 and FIG. 4 to redistribute portable electrical energy storage devices between collection, charging and distribution machines, according to one non-limiting illustrated embodiment, including analyzing the information regarding demand to increase the likelihood of availability of charged portable electrical energy storage devices at selected machines, useful in the method of FIG. 10.

FIG. 13 is a flow diagram showing a low level method of operating the distribution management system of FIG. 3 and FIG. 4 to redistribute portable electrical energy storage devices between collection, charging and distribution machines, according to one non-limiting illustrated embodiment, including sending the information regarding demand to one or more portable electrical energy storage device transfer services, useful in the method of FIG. 10.

FIG. 14 is a flow diagram showing a high level method of operating the collection, charging and distribution machine of FIG. 1 to redistribute portable electrical energy storage devices between collection, charging and distribution machines, according to one non-limiting illustrated embodiment.

FIG. 15 is a flow diagram showing a low level method of operating the collection, charging and distribution machine of FIG. 1 to redistribute portable electrical energy storage devices between collection, charging and distribution machines, according to one non-limiting illustrated embodiment, including sending the information regarding portable electrical energy storage device exchanges to a central portable electrical energy storage device distribution management system, useful in the method of FIG. 14.

FIG. 16 is a flow diagram showing a low level method of operating the collection, charging and distribution machine of FIG. 1 to redistribute portable electrical energy storage devices between collection, charging and distribution machines, according to one non-limiting illustrated embodiment, by causing a message to be presented to the user regarding exchanging the portable electrical energy storage device at one or more other selected machines, useful in the method of FIG. 14.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
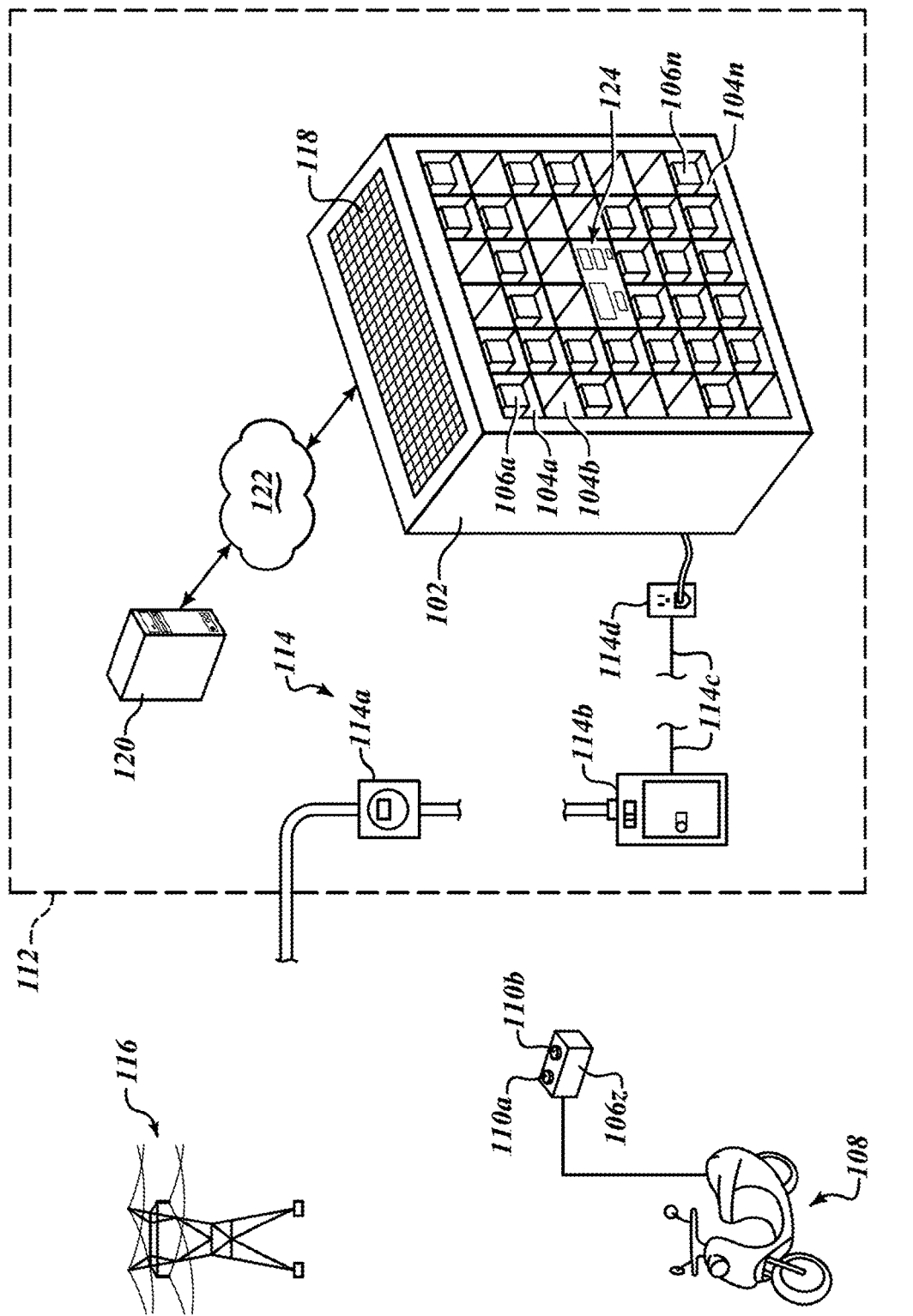
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or supercapacitors or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

However, some collection, charging and distribution machines 102 may experience higher demand for charged portable electrical energy storage devices 106 than other collection, charging and distribution machines 102 due to particular busy times of day, week or year and also due to other factors. These other factors may include, among others, a larger or smaller number of people using electrically powered vehicles in particular locations than others and particular locations having collection, charging and distribution machines 102 in high traffic or convenient areas for commuters. The ability to quickly build or reconfigure the network and/or redistribute charged portable electrical energy storage devices 106 between, collection, charging and distribution machines 102, as well as determine a better distribution going forward is addressed herein.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed in U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
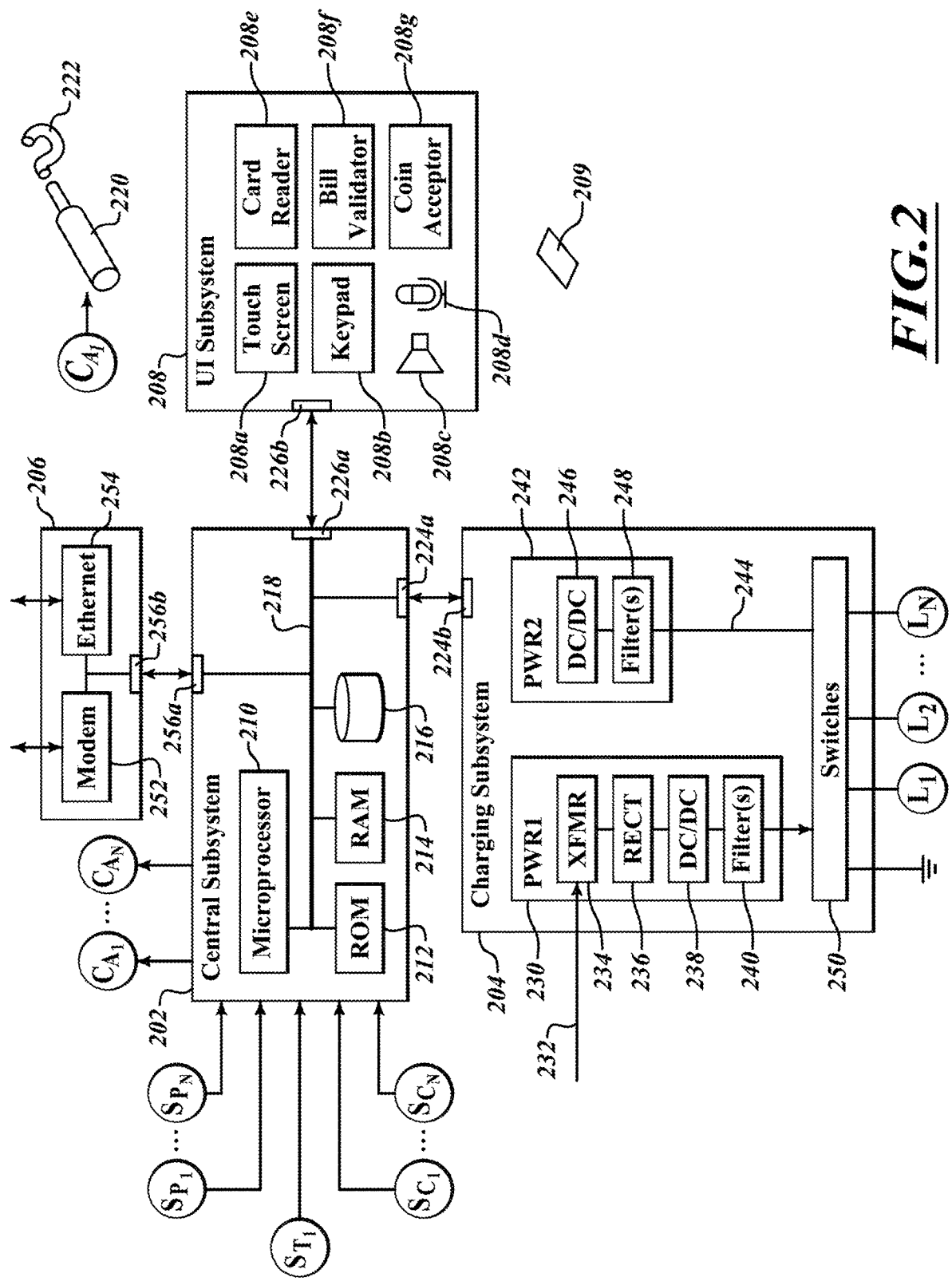
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 210. Execution of the instructions and sets of data or values causes the controller 210 to perform specific acts to cause the collection, charging and distribution machine 102 to collect, charge, and distribute portable energy storage devices. Specific operation of the collection, charging and distribution machine 102 is described herein and also below with reference to various flow diagrams (FIGS. 14-16).

The controller 210 may use RAM 214 in a conventional fashion, for volatile storage of instructions, data, etc. The controller 210 may use data store 216 to log or retain information, for example telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 204. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 234 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1). The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses.

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3:
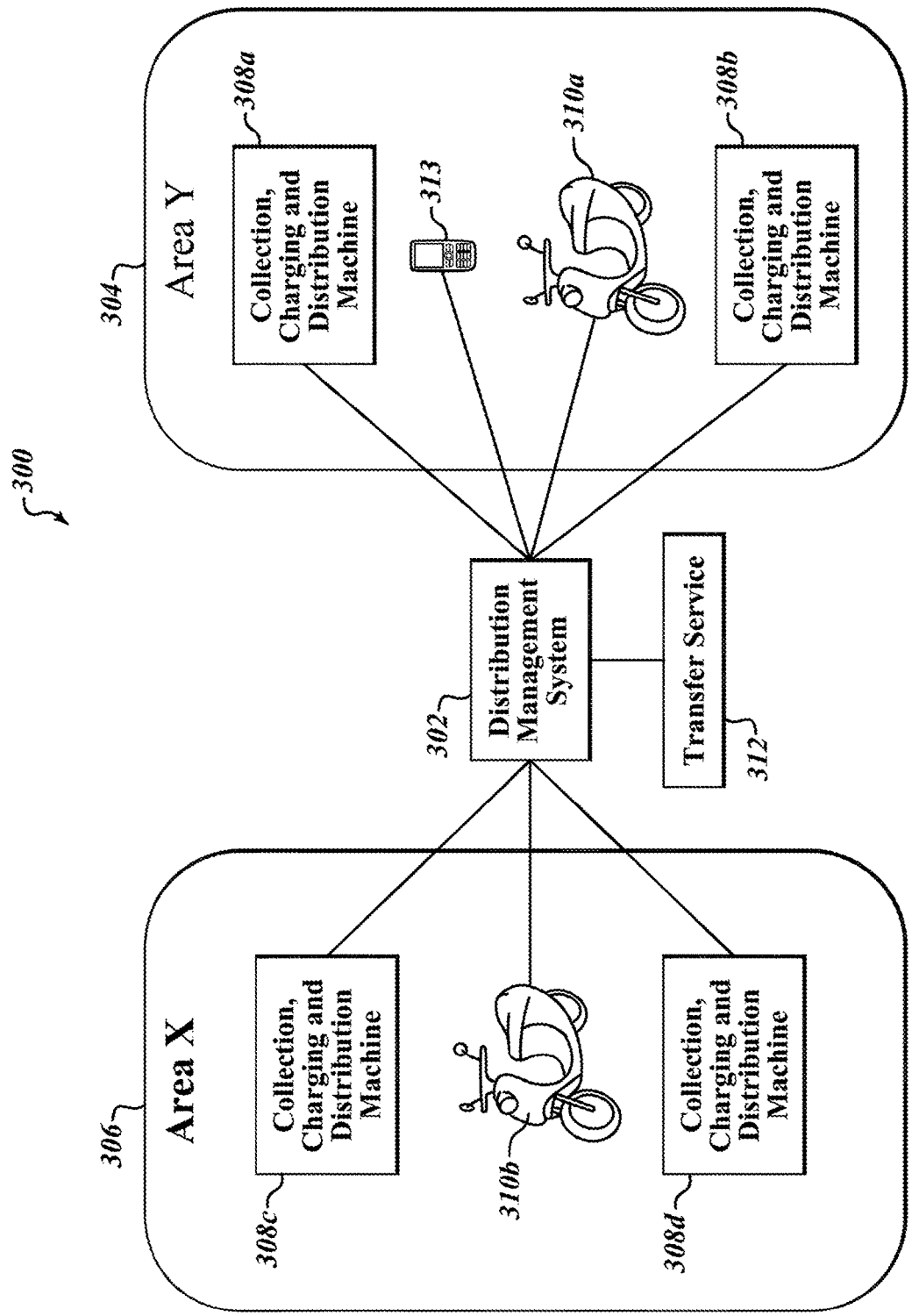
FIG. 3 is a block diagram of a system for redistribution of portable electrical energy storage devices between collection, charging and distribution machines, such as that of FIG. 1, according to one non-limiting illustrated embodiment.

FIG. 3 is a block diagram of a system 300 for redistribution of portable electrical energy storage devices between collection, charging and distribution machines, such as that of FIG. 1, according to one non-limiting illustrated embodiment.

Shown is a distribution management system 302 for managing distribution and redistribution of portable electrical energy storage devices 106 between collection, charging and distribution machines, such as, for example, machines like the collection, charging and distribution machine 102 of FIG. 1. In some embodiments, the distribution management system 302 may be the back end or back office system 120 shown in FIG. 1. In other embodiments, the distribution management system 302 may be part of or may in operable communication with, the back end or back office system 120 shown in FIG. 1.

For illustrative purposes, shown are two example areas, Area X 306 and Area Y 304, which each contain one or more collection, charging and distribution machines and one or more electrically powered vehicles. As shown in FIG. 3, as an example, Area Y 304 includes collection, charging and distribution machine 308a, collection, charging and distribution machine 308b and vehicle 310a. Area X 306 includes collection, charging and distribution machine 308c, collection, charging and distribution machine 308d and vehicle 310b. Each area represents a different geographic location whose boundaries may be defined by any number of criteria including, but not limited to, property, neighborhood, district, municipality, city, population, county, state, province, country, road, water, longitudinal or latitudinal, boundaries or any other public, private, physical or political boundary. Also, each area may contain fewer or more collection, charging and distribution machines and/or fewer or more electrically powered vehicles. In other configurations and embodiments, there may be fewer or more areas, or there may not be any particular area defined.

The distribution management system 302 is in operable communication with the collection, charging and distribution machines 308a, 308b, 308c and 308d, as well as a portable electrical energy storage device transfer service 312 and one or more user mobile communication devices 313 (only one shown as an example), such that data may be exchanged between the distribution management system 302, the collection, charging and distribution machines 308a, 308b, 308c and 308d, the portable electrical energy storage device transfer service 312, and the user mobile communication device 313. This data may be actual, expected or predicted demand for charged portable electrical energy storage devices at specific locations, areas and machines, portable electrical energy storage device exchanges occurring at various machines, and/or regarding redistribution of portable electrical energy storage devices between charging and distribution machines 308a, 308b, 308c and 308d. Also, the distribution management system 302, the collection, charging and distribution machines 308a, 308b, 308c and 308d, the portable electrical energy storage device transfer service 312, and the user mobile communication device 313 may, in some embodiments, additionally or instead be in operable communication directly with each other.

This communication between the various items, systems and entities of FIG. 3 is enabled by the various communications subsystems of these various items, systems and entities. For example, this communication may be enabled by the various communications subsystems of the distribution machines 308a, 308b, 308c and 308d, the distribution management system 302, the vehicles 310a and 310b, the transfer service 312 and the user mobile communications device 313. One or more of such communication subsystems may provide wired and/or wireless communications (e.g., cellular, local area network connections, and/or short range wireless connections). The communications subsystems of the items in FIG. 3 may include one or more ports, wireless receivers, wireless transmitters or wireless transceivers to provide wireless signal paths to the various remote components or systems. The remote communications subsystems may include one or more bridges or routers suitable to handle network traffic including switched packet type communications protocols (TCP/IP), Ethernet or other networking protocols.

As actual, expected or predicted demand at individual collection, charging and distribution machines increases or decreases relative to other collection, charging and distribution machines, there may be a surplus or deficit of charged portable electrical energy storage devices at certain machines, or in particular areas having one or more machines, at any given time. Thus, in order to meet the current demand, it may be advantageous to redistribute one or more charged portable electrical energy storage devices from one collection, charging and distribution machine to another collection, charging and distribution machine in an expeditious manner. Also, it may be advantageous to have users exchange their depleted portable electrical energy storage devices at collection, charging and distribution machines that have a larger surplus of charged portable electrical energy storage devices.

For example, if collection, charging and distribution machine 308a has 50 charged electrical energy storage devices and collection, charging and distribution machine 308c has only 3 charged electrical energy storage devices, it may be advantageous to redistribute one or more electrical energy storage devices from collection, charging and distribution machine 308a to collection, charging and distribution machine 308c if collection, charging and distribution machine 308a is experiencing less demand than collection, charging and distribution machine 308c. In order to do so, once the imbalance is detected by the distribution management system 302, the distribution management system 302 may automatically send instructions to the transfer service 312 to physically perform the redistribution or bring additional charged electrical energy storage devices into the network of collection, charging and distribution machines. This process may be accomplished in a variety of ways.

For example, the distribution management system 302 may receive an update from collection, charging and distribution machine 308c indicating the current inventory of charged electrical energy storage devices, and/or the distribution management system 302 may receive an alert from collection, charging and distribution machine 308a that it is below a threshold level of charged electrical energy storage devices. In some embodiments, the distribution management system 302 may continually or periodically monitor the inventories of charged electrical energy storage devices of all or many of the collection, charging and distribution machines and then determine which ones of the collection, charging and distribution machines experiencing lower demand may sacrifice charged electrical energy storage devices to provide to other collection, charging and distribution machines experiencing a higher demand at a given time. Also, the collection, charging and distribution machines may continually or periodically provide updates to the distribution management system 302 regarding the inventory of charged electrical energy storage devices of the respective collection, charging and distribution machine. The transfer service 312 may then automatically dispatch a person to physically transfer charged electrical energy storage devices between collection, charging and distribution machines, or deliver one or more additional charged electrical energy storage devices into the network of collection, charging and distribution machines at the high demand collection, charging and distribution machines.

In some embodiments, once the distribution management system 302 is alerted or determines that a redistribution should occur, the distribution management system 302 may cause a message to be sent to one or more users including information identifying selected collection, charging and distribution machines to return their portable electrical energy storage device to according to the determined redistribution. The message may be received, for example, by the user's mobile communication device 313 or by a communication device of the user's vehicle. If the user returns a depleted or nearly depleted portable electrical energy storage device to a collection, charging and distribution machine that has a higher relative surplus of charged electrical energy storage devices then the demand at the collection, charging and distribution machines that have a relative deficit of electrical energy storage devices may be eased, thus increasing the likelihood of availability of charged portable electrical energy storage devices within the system 300 as a whole and better meeting the overall demand of charged electrical energy storage devices within the system 300.

In some instances, the selected collection, charging and distribution machines may be further away from the user's current location than other collection, charging and distribution machines that perhaps are currently experiencing higher demand. Thus, the message may include a redeemable incentive for the user to exchange or return their portable electrical energy storage devices to one of the selected collection, charging and distribution machines instead. For example, the incentive may be redeemable as a discount or credit on fees related to the use of one or more of the plurality of collection, charging and distribution machines. Also, users may be provided similar incentives to return or exchange electrical energy storage devices before they are depleted or almost depleted to head off or smooth out an anticipated spike in demand. For example, when a user exchanges a portable electrical energy storage device before the charge is depleted or almost depleted, the returned portable electrical energy storage device may have a chance to charge fully before an anticipated spike in demand (e.g., during times when there are anticipated large numbers of users on the road or during times when demand is otherwise high) while the newly charged portable electrical energy storage device for which it was exchanged is anticipated to last throughout the spike in demand. The current charge levels may be detected using a combination of various portable electrical energy storage device sensors, tracking systems, and wireless communication systems described herein, may be estimated based on user usage history and time elapsed since the user's last portable electrical energy storage device exchange, or may be detected by the collection, charging and distribution machine once the user attempts to return the portable electrical energy storage device.

Also, the distribution management system 302 may automatically initiate a process to install new collection, charging and distribution machines or remove old collection, charging and distribution machines, respectively, in particular areas experiencing high demand and frequent deficit of charged electrical energy storage devices or low demand and frequent deficit of charged electrical energy storage devices. For example, if all the collection, charging and distribution machines in a particular area, such as collection, charging and distribution machine 308a and collection, charging and distribution machine 308b in Area Y 304, frequently experience a deficit of charged electrical energy storage devices as determined by the distribution management system 302, then the distribution management system 302 may automatically initiate a process to install new collection, charging and distribution machines in that area (e.g., Area Y) to meet the demand. The distribution management system 302 may, for example, send an electronic indication to dispatch one or more service systems to install one or more collection, charging and distribution machines in available locations within Area Y 304. A charged portable electrical energy storage device deficit may, for example, be detected by an inventory of charged electrical energy storage devices at one or more collection, charging and distribution machines falling below a threshold, by the quantity of attempted charged portable electrical energy storage device acquisitions by users at one or more collection, charging and distribution machines, etc.

The threshold may be determined based on or as a function of any variety of factors, including, but not limited to: actual or current demand or anticipated or predicted demand for charged electrical energy storage devices, number of portable electrical energy storage device acquisitions or exchanges at one or more collection, charging and distribution machines, number of portable electrical energy storage device acquisitions or exchanges at one or more collection, charging and distribution machines within a specified time period, quantity of users and/or quantity of user vehicles currently within a specified location or area, quantity of user vehicles currently operating within a specified location or area, current time period (e.g., time of day, month, year, holiday, etc.), route data of users, location of collection, charging and distribution machine, traffic conditions, and any other factors related to portable electrical energy storage device demand or anticipated portable electrical energy storage device demand.

Data regarding the quantity of users and/or quantity of user vehicles currently within a specified location or area, the quantity of user vehicles currently operating within a specified location or area and the route data of users may be tracked and/or stored via one or any combination of: previous collection, charging and distribution machine usage locations of individual users, user vehicle telematic and telemetric systems, navigation and/or location services such as global positioning systems (GPS), satellite tracking systems, and dead reckoning based on previous collection, charging and distribution machine usage locations, etc., associated with and/or in operable communication with the user's mobile communication device 313, current portable electrical energy storage device, and/or vehicle (e.g., vehicle 310a). This data may be provided to the distribution management system 302 to determine current or anticipated demand to redistribute electrical energy storage devices to better meet the current or anticipated demand. In some embodiments, provision and use of one or more of such tracking systems may be required of users in order to use the collection, charging and distribution machines, as may be automatically indicated and verified via a user account and identity verification at the respective collection, charging and distribution machine by use of various authentication measures as described herein.

A user's historical route information may be utilized by the distribution management system 302 to anticipate demand for charged electrical energy storage devices, and thus determine the charged portable electrical energy storage device inventory thresholds described above. For example, if a user of vehicle 310a historically makes a weekly route stopping at collection, charging and distribution machine 308a on day 1, then collection, charging and distribution machine 308b on day 4 and then collection, charging and distribution machine 308d on day 7, each time to acquire a charged portable electrical energy storage device, then the distribution management system 302 may anticipate that there will be a demand for at least one charged portable electrical energy storage device at collection, charging and distribution machine 308a on day 1, at collection, charging and distribution machine 308b on day 4 and then at collection, charging and distribution machine 308d on day 7, for each normal week going forward. The distribution management system 302 may also anticipate approximate times on each day the demand will occur based on the regularity of the usage history of the user with respect to the times of day of the usage. The distribution management system 302 may then aggregate such data for all known users to estimate and thus anticipate a quantity of charged electrical energy storage devices that will likely be needed at each collection, charging and distribution machine according to regular usage patterns.

By tracking the regular routes of the users rather than just the number of charged portable electrical energy storage device acquisitions or attempted acquisitions occurring at various times at each collection, charging and distribution machine, the distribution management system 302 may also estimate the current charge level of the portable electrical energy storage device of the user, to anticipate an upcoming demand for a charged portable electrical energy storage device. For example, if the user of vehicle 310a having a regular usage and route history as described above, but instead all within Area Y 304, has visited collection, charging and distribution machine 308a on day 1, but it is now day 7 and the user has not since visited another collection, charging and distribution machine, the distribution management system 302 may assume for estimation purposes that the portable electrical energy storage device of the user is nearly depleted and a demand for a charged portable electrical energy storage device within the user's area (Area Y 304) will occur very soon. As described above, the distribution management system 302 may aggregate all such data for all known users to estimate and thus anticipate a quantity of charged electrical energy storage devices that will likely be needed at each collection, charging and distribution machine according to regular usage patterns and other factors.

Figure 4:
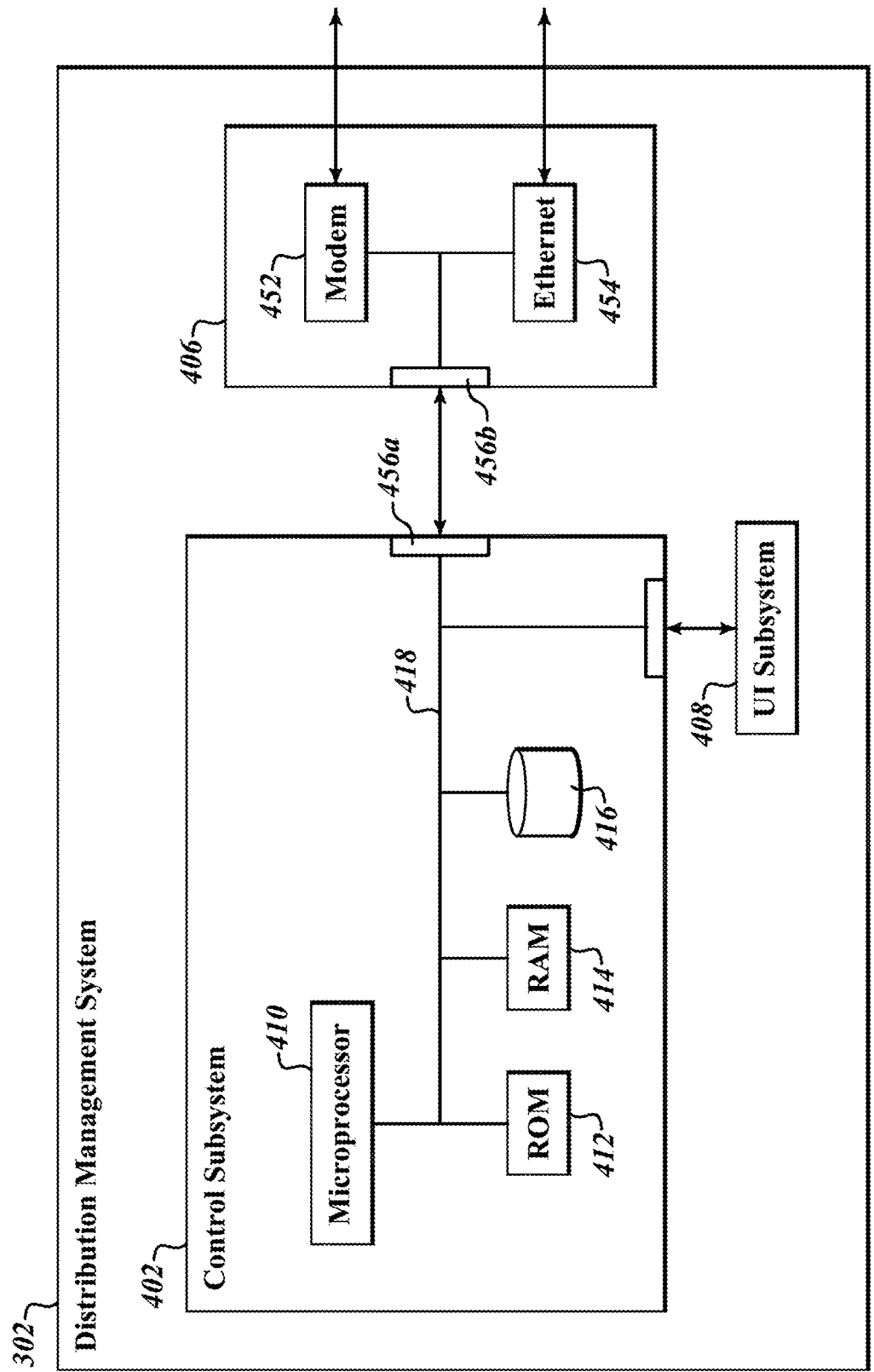
FIG. 4 is a schematic view of the distribution management system of FIG. 3 and FIG. 4, according to one non-limiting illustrated embodiment.

FIG. 4 is a schematic view of the distribution management system 302 of FIG. 3, according to one non-limiting illustrated embodiment.

The distribution management system 302 includes a control subsystem 402, a charging subsystem 204, a communications subsystem 406, and a user interface subsystem 408.

The control subsystem 402 includes a controller 410, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The control subsystem 402 may also include one or more non-transitory processor- or computer-readable storage media, for example read only memory (ROM) 412, random access memory (RAM) 414, and data store 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The control subsystem 402 may include one or more buses 418 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the distribution management system 302 to manage distribution and redistribution of portable electrical energy storage devices 106 between collection, charging and distribution machines, such as, for example, machines like the collection, charging and distribution machine 102 of FIG. 1. Specific operation of the distribution management system 302 is described herein and also below with reference to various flow diagrams (FIGS. 5-13).

The controller 410 may use RAM 414 in a conventional fashion, for volatile storage of instructions, data, etc. The controller 410 may use data store 416 to log or retain information, for example, information regarding portable electrical energy storage device acquisitions and exchanges occurring at a plurality of collection, charging and distribution machines, information regarding demand for charged portable electrical energy storage devices, the demand being at a plurality of collection, charging and distribution machines for portable electrical energy storage devices, information regarding relative demand for charged portable electrical energy storage devices between different times of day, week or year, information regarding relative demand of charged portable electrical energy storage devices between geographical locations, information regarding historic usage patterns of one or more of the plurality of collection, charging and distribution machines, information regarding user vehicle locations and telematic and/or telemetric user vehicle information, information regarding portable electrical energy storage device charge capacity, information regarding route information of users of one or more of the charged portable electrical energy storage devices, information regarding energy storage devices, telemetric information related to collection, charging and/or distribution or collection of the portable electric power storage devices 106 and/or operation of the distribution management system 302 itself. The instructions are executable by the controller 410 to control operation of the distribution management system 302 in response to input from remote systems such as collection, charging and distribution machines, collection, charging and distribution machine service systems, user mobile devices, user vehicles, and end user or operator input, and using data or values for the variables or parameters.

The control subsystem 402 may also receive signals from various sensors and/or components of a collection, charging and distribution machine, such as the collection, charging and distribution machine 102 of FIG. 1 via the communications subsystem 206 of collection, charging and distribution machine 102. This information may include information that characterizes or is indicative of operation, status, or condition of such components. Sensors are represented in FIG. 2 by the letter S appearing in a circle along with appropriate subscript letters. For example, one or more position sensors $S_{P1}$-$S_{PN}$ may detect the presence or absence of portable electrical power storage device 106 at each of the receivers 104. This information may be communicated to the control subsystem 402. Also, one or more charge sensors $S_{C1}$-$S_{CN}$ may detect a charge level charge of the portable electrical power storage devices 106 at each of the receivers 104. This information may also be communicated to the control subsystem 402.

The communications subsystem 406 may include one or more communications modules or components which facilities communications with the various components of a collection, charging and distribution machine, such as collection, charging and distribution machine 102 of FIG. 1 and also the various components of the collection, charging and distribution machines 308a, 308b, 308c and 308d of FIG. 3, the portable electrical energy storage device transfer service 312 and the one or more user mobile communication devices 313, such that data may be exchanged between the distribution management system 302, the collection, charging and distribution machines 308a, 308b, 308c and 308d, the portable electrical energy storage device transfer service 312, and the user mobile communication device 313. The communications subsystem 406 may, for example, include one or more modems 452 or one or more Ethernet or other types of communications cards or components 454. A port 456a of the control subsystem 402 may communicatively couple the control subsystem 402 with a port 456b of the communications subsystem 406. The communications subsystem 406 may provide wired and/or wireless communications. The communications subsystem 406 may include one or more ports, wireless receivers, wireless transmitters or wireless transceivers to provide wireless signal paths to the various remote components or systems. The remote communications subsystem 406 may include one or more bridges or routers suitable to handle network traffic including switched packet type communications protocols (TCP/IP), Ethernet or other networking protocols.

The user interface system 408 includes one or more user input/output (I/O) components (not illustrated). For example, user interface system 408 may include a touch screen display operable to present information and a graphical user interface (GUI) to a user and to receive indications of user selections. The user interface system 408 may include a keyboard or keypad, and/or a cursor controller (e.g., mouse, trackball, trackpad) to allow a user to enter information and/or select user selectable icons in a GUI.

Figure 5:
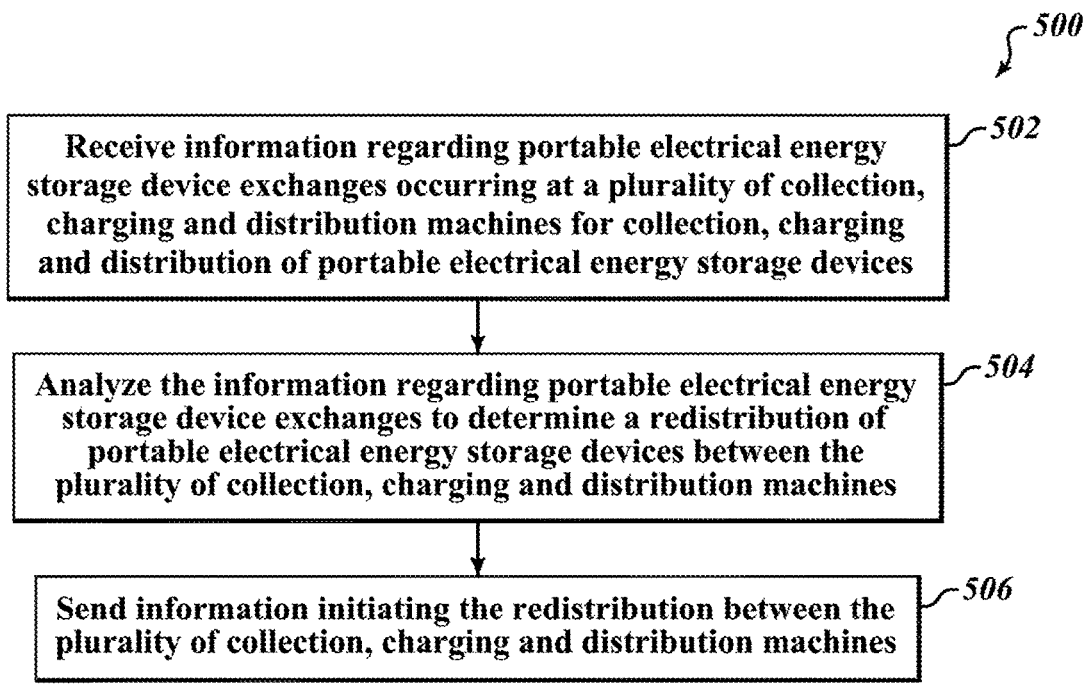
FIG. 5 is a flow diagram showing a high level method of operating the distribution management system of FIG. 3 and FIG. 4 to redistribute portable electrical energy storage devices between collection, charging and distribution machines, according to one non-limiting illustrated embodiment.

FIG. 5 shows a high level method 500 of operating the distribution management system 302 of FIG. 3 and FIG. 4 to redistribute portable electrical energy storage devices between collection, charging and distribution machines, according to one non-limiting illustrated embodiment.

At 502, the distribution management system 302 receives information regarding portable electrical energy storage device exchanges occurring at a plurality of collection, charging and distribution machines for collection, charging and distribution of portable electrical energy storage devices. For example, this information may be representative of current demand for charged portable electrical energy storage device at individual collection, charging and distribution machines, or collectively for a group of collection, charging and distribution machines.

At 504, the distribution management system 302 analyzes the information regarding portable electrical energy storage device exchanges to determine a redistribution of portable electrical energy storage devices between the plurality of collection, charging and distribution machines. For example, in order to meet the current actual demand or predicted demand, it may be advantageous to redistribute one or more charged portable electrical energy storage devices from one collection, charging and distribution machine to another collection, charging and distribution machine in an expeditious manner, or to introduce new charged portable electrical energy storage device into a network of collection, charging and distribution machines, or install new collection, charging and distribution machines within the network to handle the increased desired inventory to meet demand.

At 506, the distribution management system 302 sends information initiating the redistribution between the plurality of collection, charging and distribution machines.

The information regarding portable electrical energy storage device exchanges may indicate a first one of the plurality of collection, charging and distribution machines has a lower inventory of charged portable electrical energy storage devices than a second one of the plurality of collection, charging and distribution machines. The information initiating the redistribution may include information to initiate redistribution of one or more portable electrical energy storage devices from the second one of the plurality of collection, charging and distribution machines to the first one of the plurality of collection, charging and distribution machines.

Figure 6:
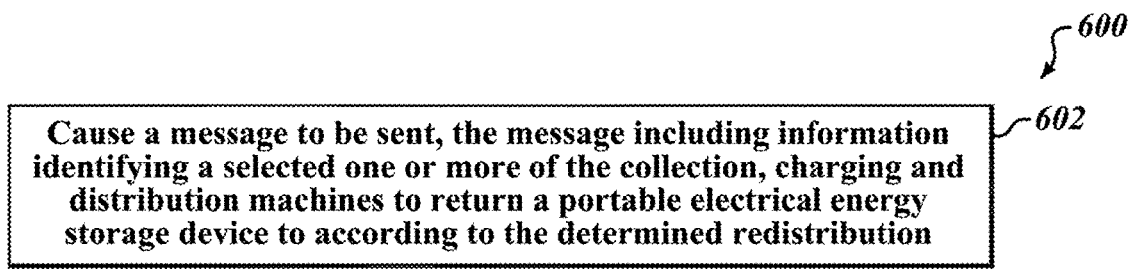
FIG. 6 is a flow diagram showing a low level method of operating the distribution management system of FIG. 3 and FIG. 4 to redistribute portable electrical energy storage devices between collection, charging and distribution machines, according to one non-limiting illustrated embodiment, including causing a message to be sent including information identifying a selected one or more of the collection, charging and distribution machines, useful in the method of FIG. 5.

FIG. 6 shows a low level method 600 of operating the distribution management system 302 of FIG. 3 and FIG. 4 to redistribute portable electrical energy storage devices between collection, charging and distribution machines, according to one non-limiting illustrated embodiment, including causing a message to be sent including information identifying a selected one or more of the collection, charging and distribution machines, useful in the method of FIG. 5.

At 602, the distribution management system 302 causes a message to be sent. The message includes information identifying a selected one or more of the collection, charging and distribution machines to return a portable electrical energy storage device to, according to the determined redistribution. In some embodiments, the message includes a redeemable incentive to the user to return the portable electrical energy storage device to the selected one or more collection, charging and distribution machines.

For example, the incentive may be a credit, payment, points, coupon, card or voucher provided to the user upon the user returning the portable electrical energy storage device at the selected collection, charging and distribution machine. The selected collection, charging and distribution machine may communicate the return of the portable electrical energy storage device to an accounting subsystem that is configured to provide a credit to the account of the user or communicate the return to the distribution management system or another back end system. The distribution management system may then directly provide a credit to the account of the user or communicate with another back end system (i.e., back end or back office systems 120 shown in FIG. 1) or other accounting system within or external to the back end or back office system that will provide a credit to the account of the user. The account of the user may be any account associated with the back end or back office systems, the distribution management system, a financial institution of the user, or any other account associated with the user or from which funs or credits are used to purchase or rent the portable electrical energy storage device.

The credit may be in the form of money, points, or any other item of value. For example, the credit, coupon or voucher may be for an upgraded, new, or high performance portable electrical energy storage device that may be provided by the collection, charging and distribution machine to the user immediately upon return of the user's current portable electrical energy storage device at the selected collection, charging and distribution machine. Also, the collection, charging and distribution machine may provide printed or electronic coupons, cards or vouchers that are redeemable at one or more other collection, charging and distribution machines for the upgraded portable electrical energy storage device. The printed or electronic coupons, cards or vouchers may have one or more machine readable symbols that a scanner of the collection, charging and distribution machine reads to determine the value and other relevant data regarding the coupon or voucher. Also, the incentive may be stored as a credit on a card associated with the user that has a machine readable symbol, strip, RFID, or other chip to store such information.

Figure 7:
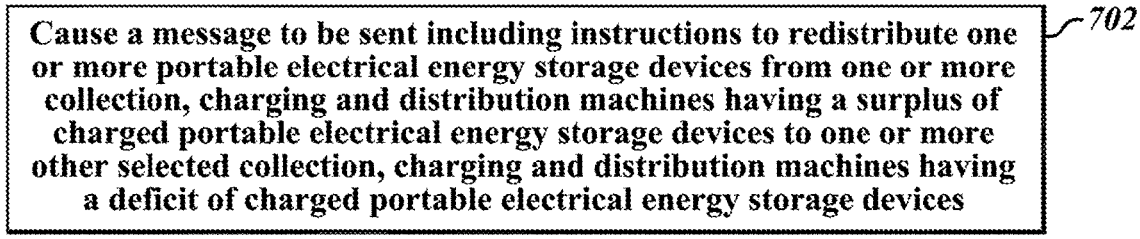
FIG. 7 is a flow diagram showing a low level method of operating the distribution management system of FIG. 3 and FIG. 4 to redistribute portable electrical energy storage devices between collection, charging and distribution machines, according to one non-limiting illustrated embodiment, including causing a message to be sent including instructions to redistribute electrical energy storage devices, useful in the method of FIG. 5.

FIG. 7 shows a low level method 700 of operating the distribution management system 302 of FIG. 3 and FIG. 4 to redistribute portable electrical energy storage devices between collection, charging and distribution machines, according to one non-limiting illustrated embodiment, including causing a message to be sent including instructions to redistribute electrical energy storage devices, useful in the method of FIG. 5.

At 702, the distribution management system 302 causes a message to be sent including instructions to redistribute one or more portable electrical energy storage devices from one or more collection, charging and distribution machines having a surplus of charged portable electrical energy storage devices to one or more other selected collection, charging and distribution machines having a deficit of charged portable electrical energy storage devices.

FIG. 8 shows a low level method 800 of operating the distribution management system 302 of FIG. 3 and FIG. 4 to redistribute portable electrical energy storage devices between collection, charging and distribution machines, according to one non-limiting illustrated embodiment, including redistributing portable electrical energy storage devices, useful in the method of FIG. 5.

At 802, the distribution management system 302 causes redistribution of the one or more portable electrical energy storage devices from the one or more collection, charging and distribution machines having the surplus of charged portable electrical energy storage devices to the one or more other selected collection, charging and distribution machines having the deficit of charged portable electrical energy storage devices. For example, this may be via one or more portable electrical energy storage device transfer services or via the users of the portable electrical energy storage devices returning the portable electrical energy storage devices to locations selected by the distribution management system 302.

FIG. 9 shows a low level method 900 of operating the distribution management system 302 of FIG. 3 and FIG. 4 to redistribute portable electrical energy storage devices between collection, charging and distribution machines, according to one non-limiting illustrated embodiment, including sending information regarding installation or removal of collection, charging and distribution machines, useful in the method of FIG. 5.

At 902, the distribution management system 302 sends, based on analyzing the information regarding portable electrical energy storage device exchanges, information initiating at least one of: installation of one or more new collection, charging and distribution machines and removal of one or more existing collection, charging and distribution machines of the plurality of collection, charging and distribution machines.

FIG. 10 shows a high level method 1000 of operating the distribution management system 302 of FIG. 3 and FIG. 4 to redistribute portable electrical energy storage devices between collection, charging and distribution machines, according to one non-limiting illustrated embodiment, including determining a redistribution based on received information regarding demand for charged portable electrical energy storage devices.

At 1002, the distribution management system 302 receives information regarding demand for charged portable electrical energy storage devices, the demand being at a plurality of collection, charging and distribution machines for portable electrical energy storage devices.

At 1004, the distribution management system 302 determines a redistribution of portable electrical energy storage devices between the plurality of collection, charging and distribution machines according to at least the received information regarding demand.

At 1006, the distribution management system 302 sends information initiating the redistribution between the plurality of collection, charging and distribution machines.

FIG. 11 shows a low level method 1100 of operating the distribution management system 302 of FIG. 3 and FIG. 4 to redistribute portable electrical energy storage devices between collection, charging and distribution machines, according to one non-limiting illustrated embodiment, including determining the redistribution according to an accelerated charging scenario at a collection, charging and distribution machine, useful in the method of FIG. 10.

At 1102, the distribution management system 302 determines the redistribution according to a first number of portable electrical energy storage devices currently removably located at a collection, charging and distribution machine of the plurality of collection, charging and distribution machines to be charged at an accelerated rate relative to at least a second number of portable electrical energy storage devices currently removably located at the collection, charging and distribution machine via energy supplied from at least the second number of portable electrical energy storage devices.

For example, if the first number of portable electrical energy storage devices is currently using the energy from the second number of portable electrical energy storage devices, then the distribution management system 302 may determine that the collection, charging and distribution machine containing those portable electrical energy storage devices may need more charged portable electrical energy storage devices at that particular collection, charging and distribution machine to support the accelerated charging and the general user demand at that particular collection, charging and distribution machine. The distribution of electrical energy storage devices between the collection, charging and distribution machines in the system 300 may then be adjusted accordingly by the distribution management system 302.

FIG. 12 shows a low level method 1200 of operating the distribution management system 302 of FIG. 3 and FIG. 4 to redistribute portable electrical energy storage devices between collection, charging and distribution machines, according to one non-limiting illustrated embodiment, including analyzing the information regarding demand to increase the likelihood of availability of charged portable electrical energy storage devices at selected machines, useful in the method of FIG. 10.

At 1202, the distribution management system 302 analyzes the information regarding demand to increase the likelihood of availability of charged portable electrical energy storage devices at selected collection, charging and distribution machines of the plurality of collection, charging and distribution machines. This analysis is done to meet current or predicted demand of charged portable electrical energy storage devices at the particular collection, charging and distribution machines of the plurality of collection, charging and distribution machines.

FIG. 13 shows a low level method 1300 of operating the distribution management system 302 of FIG. 3 and FIG. 4 to redistribute portable electrical energy storage devices between collection, charging and distribution machines, according to one non-limiting illustrated embodiment, including sending the information regarding demand to one or more portable electrical energy storage device transfer services, useful in the method of FIG. 10.

At 1302, the distribution management system 302 sends the information regarding demand to one or more portable electrical energy storage device transfer services. For example, the distribution management system 302 may automatically send instructions to the transfer service 312 (shown in FIG. 3) to physically perform the redistribution or bring additional charged electrical energy storage devices into the network of collection, charging and distribution machines in the system 300 (shown in FIG. 3).

FIG. 14 shows a high level method 1400 of operating the collection, charging and distribution machine 102 of FIG. 1 to redistribute portable electrical energy storage devices between collection, charging and distribution machines, according to one non-limiting illustrated embodiment.

At 1402, the collection, charging and distribution machine 102 sends information regarding portable electrical energy storage device exchanges occurring at the collection, charging and distribution machine (which is one of a plurality of such collection, charging and distribution machines).

At 1404, the collection, charging and distribution machine 102 receives information regarding portable electrical energy storage device redistribution between the collection, charging and distribution machine and one or more other collection, charging and distribution machines of the plurality of collection, charging and distribution machines;

At 1406, the collection, charging and distribution machine 102 receives a request from a user to exchange a portable electrical energy storage device at the collection, charging and distribution machine;

At 1408, the collection, charging and distribution machine 102 responds to the request to exchange the portable electrical energy storage device based on the received information regarding portable electrical energy storage device redistribution.

FIG. 15 shows a low level method 1500 of operating the collection, charging and distribution machine 102 of FIG. 1 to redistribute portable electrical energy storage devices between collection, charging and distribution machines, according to one non-limiting illustrated embodiment, including sending the information regarding portable electrical energy storage device exchanges to the distribution management system 302 (shown in FIG. 3 and in FIG. 4), useful in the method of FIG. 14.

At 1502, the collection, charging and distribution machine 102 sends the information regarding portable electrical energy storage device exchanges to distribution management system 302. For example, this information is sent to the distribution management system 302 such that the distribution management system 302 can track usage data at the collection, charging and distribution machine 102 and determine demand and the distribution and redistribution of portable electrical energy storage devices between collection, charging and distribution machines accordingly.

FIG. 16 shows a low level method 1600 of operating the collection, charging and distribution machine 102 of FIG. 1 to redistribute portable electrical energy storage devices between collection, charging and distribution machines, according to one non-limiting illustrated embodiment, by causing a message to be presented to the user regarding exchanging the portable electrical energy storage device at one or more other selected machines, useful in the method of FIG. 14.

At 1602, the collection, charging and distribution machine 102 causes a message to be presented to the user regarding exchanging the portable electrical energy storage device at one or more other selected collection, charging and distribution machines of the plurality of collection, charging and distribution machines according to the received information regarding portable electrical energy storage device redistribution. For example, this message presentation may occur according to instructions provided to the collection, charging and distribution machine 102 by the distribution management system 302 or other backend central control system such back end or back office systems 120 shown in FIG. 1. Alternatively, the collection, charging and distribution machine 102 may present the message based on a determination made by the collection, charging and distribution machine 102 that a redistribution of electrical energy storage devices should occur based on current demand and information received from other collection, charging and distribution machines. In some instances, the message includes a redeemable incentive to the user to return the portable electrical energy storage device to the one or more other selected collection, charging and distribution machines.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. patent application Ser. No. 13/559,091 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Jul. 26, 2012, U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DIS- TRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314, filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,038, filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559,264, filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,054, filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390, filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343, filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064, filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a distribution management system for portable electrical energy storage devices, the method comprising:

receiving, by a distribution management system for portable electrical energy storage devices, information regarding a predicted demand for charged portable electrical energy storage devices, wherein the information regarding demand includes information tracking physical exchanges of portable electrical energy storage devices for the charged portable electrical energy storage devices at a plurality of distribution machines for distribution of portable electrical energy storage devices, wherein the predicted demand is associated with the plurality of distribution machines at multiple locations, and wherein the predicted demand is for multiple users at the multiple locations;

analyzing, by the distribution management system, the information tracking physical exchanges of portable electrical energy storage devices for charged portable electrical energy storage devices to determine a physical redistribution of portable electrical energy storage devices between the plurality of distribution machines; and sending, by the distribution management system, information initiating the physical redistribution of portable electrical energy storage devices between the plurality of distribution machines.

2. The method of claim 1 wherein the sending the information includes causing a message to be sent, the message including information identifying a selected one or more of the distribution machines to return a portable electrical energy storage device to according to the determined physical redistribution.

3. The method of claim 1 further comprising:
redistributing one or more portable electrical energy storage devices from one or more distribution machines having a surplus of charged portable electrical energy storage devices to one or more other selected distribution machines having a deficit of charged portable electrical energy storage devices.

4. The method of claim 3 wherein the redistributing includes physically moving the one or more portable electrical energy storage devices from the one or more distribution machines having the surplus of charged portable electrical energy storage devices to the one or more other selected distribution machines having the deficit of charged portable electrical energy storage devices.

5. The method of 4 wherein the physically moving is performed by one or more delivery vehicles.

6. The method of claim 1 further comprising:
sending, by the distribution management system, based on the analyzing the information tracking physical exchanges of portable electrical energy storage devices for charged portable electrical energy storage devices, information initiating at least one of: installation of one or more new distribution machines and removal of one or more existing distribution machines of the plurality of distribution machines.

7. A distribution management system for portable electrical energy storage devices, comprising:
at least one processor of the distribution management system; and
at least one processor-readable memory coupled to the at least one processor, the at least one processor-readable memory having computer-executable instructions stored thereon that, when executed by the at least one processor, cause the distribution management system to:
receive information regarding a predicted demand for charged portable electrical energy storage devices, the predicted demand being at a plurality of distribution machines for portable electrical energy storage devices, wherein the predicted demand is for multiple users at the multiple locations, and wherein the information regarding the predicted demand includes information tracking physical exchanges of portable electrical energy storage devices for charged portable electrical energy storage devices at the plurality of distribution machines at multiple locations;
determine a physical redistribution of portable electrical energy storage devices between the plurality of distribution machines according to at least the received information regarding demand; and
send information initiating the physical redistribution between the plurality of distribution machines.

8. The distribution management system of claim 7 wherein the information regarding demand includes information regarding relative demand for charged portable electrical energy storage devices between different times of day, week or year.

9. The distribution management system of claim 7 wherein the information regarding demand includes information regarding relative demand of charged portable electrical energy storage devices between geographical locations.

10. The distribution management system of claim 7 wherein the information regarding demand includes information regarding historic usage patterns of one or more of the plurality of distribution machines.

11. The distribution management system of claim 7 wherein the information regarding demand includes information regarding user vehicle locations.

12. The distribution management system of claim 7 wherein the information regarding demand includes information regarding portable electrical energy storage device charge capacity.

13. The distribution management system of claim 7 wherein the information regarding demand includes information regarding portable electrical energy storage device exchanges occurring at the plurality of distribution machines.

14. The distribution management system of claim 7 wherein the information regarding demand includes information regarding route information associated with user profiles associated with one or more of the charged portable electrical energy storage devices.

15. The distribution management system of claim 7 wherein the computer-executable instructions that cause the distribution management system to determine the physical redistribution include further instructions to cause the distribution management system to determine the physical redistribution according to a first number of portable electrical energy storage devices currently removably located at a distribution machine of the plurality of distribution machines to be charged at an accelerated rate relative to at least a second number of portable electrical energy storage devices currently removably located at the distribution machine via energy supplied from at least the second number of portable electrical energy storage devices.

16. The distribution management system of claim 7 wherein the computer-executable instructions that cause the distribution management system to determine the physical redistribution cause the distribution management system to determine the physical redistribution by analyzing the information regarding demand to increase a likelihood of availability of charged portable electrical energy storage devices at selected distribution machines of the plurality of distribution machines to meet current or predicted demand of charged portable electrical energy storage devices at the selected distribution machines of the plurality of distribution machines.

17. The distribution management system of claim 7 wherein the information is sent to one or more distribution machines of the plurality of distribution machines.

18. The distribution management system of claim 7 wherein the computer-executable instructions, when executed, further cause the distribution management system to send the information initiating the physical redistribution to one or more devices associated with one or more users of one or more portable electrical energy storage devices, the one or more a portable electrical energy storage devices being from one or more of the distribution machines of the plurality of distribution machines.

19. The distribution management system of claim 7 wherein the computer-executable instructions, when executed, further cause the distribution management system to send the information initiating the physical redistribution to one or more portable electrical energy storage device transfer services.

20. A distribution machine for portable electrical energy storage devices, the distribution machine comprising:
   at least one processor of the distribution machine; and
   at least one processor-readable memory coupled to the at least one processor, the at least one processor-readable memory having computer-executable instructions stored thereon that, when executed by the at least one processor, cause the distribution machine to:
      send information regarding a predicted demand for charged portable electrical energy storage devices, wherein the information regarding the predicted demand includes information tracking physical exchanges of portable electrical energy storage devices for the charged portable electrical energy storage devices at the distribution machine at a first location, and wherein the predicted demand is for multiple users at the multiple locations;
      receive information regarding physical redistribution of portable electrical energy storage devices between the distribution machine and one or more other distribution machines of a plurality of distribution machines, the one or more other distribution machines are at locations different from the first location;
      receive a request to exchange a portable electrical energy storage device at the distribution machine; and
      respond to the request to exchange the portable electrical energy storage device based on the received information regarding physical redistribution of portable electrical energy storage devices between the distribution machine and the one or more other distribution machines of the plurality of distribution machines.

\* \* \* \* \*